US012591223B2

(12) United States Patent
Müller et al.

(10) Patent No.: US 12,591,223 B2
(45) Date of Patent: Mar. 31, 2026

(54) RESOURCE MANAGEMENT SYSTEM AND ADDITIVE MANUFACTURING FACILITY WITH SUCH

(71) Applicant: NIKON SLM SOLUTIONS AG, Lübeck (DE)

(72) Inventors: Bernd Müller, Lübeck (DE); Kim Kulling, Lübeck (DE); Jan Philipp Lührig, Lübeck (DE); Daniel Schmidt, Lübeck (DE)

(73) Assignee: NIKON SLM SOLUTIONS AG, Lübeck (DE)

( * ) Notice: Subject to any disclaimer, the term of this patent is extended or adjusted under 35 U.S.C. 154(b) by 349 days.

(21) Appl. No.: 18/035,539

(22) PCT Filed: Nov. 11, 2021

(86) PCT No.: PCT/EP2021/081388
    § 371 (c)(1),
    (2) Date: May 5, 2023

(87) PCT Pub. No.: WO2022/122295
    PCT Pub. Date: Jun. 16, 2022

(65) Prior Publication Data
    US 2023/0393563 A1     Dec. 7, 2023

(30) Foreign Application Priority Data
    Dec. 8, 2020    (DE) ..................... 10 2020 215 478.3

(51) Int. Cl.
    *B33Y 50/02*        (2015.01)
    *B29C 64/357*       (2017.01)
    (Continued)

(52) U.S. Cl.
    CPC ...... *G05B 19/41865* (2013.01); *B29C 64/357* (2017.08); *B29C 64/386* (2017.08);
    (Continued)

(58) Field of Classification Search
    CPC ...................................................... B33Y 50/02
    See application file for complete search history.

(56) References Cited

U.S. PATENT DOCUMENTS

| | | | |
|---|---|---|---|
| 7,887,316 B2 | 2/2011 | Cox | |
| 2011/0233808 A1* | 9/2011 | Davidson | .............. B29C 64/357 425/456 |

(Continued)

FOREIGN PATENT DOCUMENTS

| | | |
|---|---|---|
| CN | 107300894 A | 10/2017 |
| CN | 108367353 A | 8/2018 |

(Continued)

*Primary Examiner* — Suresh Suryawanshi
(74) *Attorney, Agent, or Firm* — McGlew and Tuttle, P.C.

(57) ABSTRACT

A resource management system (39) manages a supply of resource material and/or resource items to a plurality of at least two additive manufacturing machines (3) for additive manufacturing. The resource management system (39) includes a control unit (41) that is configured to receive a signal indicative of a demand for resource material and/or resource items of any of the additive manufacturing machines (3). The control unit (41) is configured to schedule the supply of demanded resource material and/or resource items according to a predetermined prioritization scheme for resolving demand conflicts.

18 Claims, 5 Drawing Sheets

(51) Int. Cl.
    *B29C 64/386*     (2017.01)
    *B29C 64/393*     (2017.01)
    *B33Y 50/00*     (2015.01)
    *G05B 19/418*     (2006.01)
    *B29C 64/153*     (2017.01)

(52) U.S. Cl.
    CPC ............ *B29C 64/393* (2017.08); *B33Y 50/00*
          (2014.12); *B33Y 50/02* (2014.12); *B29C*
      *64/153* (2017.08); *G05B 2219/32082* (2013.01)

(56)                 References Cited

U.S. PATENT DOCUMENTS

| | | |
|---|---|---|
| 2016/0167310 A1 | 6/2016 | Lee et al. |
| 2017/0096315 A1* | 4/2017 | Jackson ................. H04L 63/102 |
| 2017/0326803 A1* | 11/2017 | Chanclon ............. B29C 64/357 |
| 2018/0021855 A1 | 1/2018 | De Lajudie et al. |
| 2018/0162051 A1 | 6/2018 | Jessen |
| 2018/0264728 A1* | 9/2018 | Manuel Grases ..... B29C 64/329 |
| 2019/0009334 A1 | 1/2019 | Effernelli et al. |
| 2019/0143599 A1* | 5/2019 | Kothari ................... G06F 30/20 |
| | | 264/109 |
| 2020/0031043 A1* | 1/2020 | Krol ........................ B33Y 40/00 |
| 2020/0133235 A1* | 4/2020 | El-Tahry ................ G06Q 30/06 |
| 2021/0205889 A1* | 7/2021 | Roure Pastor .......... B22F 12/90 |
| 2021/0291454 A1* | 9/2021 | De La Cal ........... B29C 64/329 |

FOREIGN PATENT DOCUMENTS

| | | |
|---|---|---|
| CN | 109808177 A | 5/2019 |
| CN | 110443531 A | 11/2019 |
| EP | 3650205 A1 | 5/2020 |
| WO | 2018017069 A1 | 1/2018 |

* cited by examiner

29

SLM® BCM
BUILD CYLINDER MAGAZINE

| Cool down [0102.36 / 52.8 °C] | Empty Slot |
| Cool down finished – ready to unpack | Warm up [02x43.56 / 30.6 °C] |
| Without plate package | Finished warm up – ready to assign |

SLM® 800 M5 ◎
BUILD JOB X
Powder distribution [10.3 kg]
Job finished
27

SLM® 800 M4 ◎
BUILD JOB X
Powder distribution [10.3 kg]
Job finished
27

SLM® 800 M3 ◎
Ongoing build job
Powder distribution [0.0 kg]
27

SLM® 800 M2 ◎
Ongoing build job
Powder distribution [0.0 kg]
27

SLM® 800 M1 ◎
BUILD JOB X
Powder distribution [10.3 kg]
Job finished
27

SLM® PRS
POWDER REMOVAL STATION

| Buffer tank [10.3 kg] | Ready for build job | Ready for build job |
| Ready for build job | | |

RESOURCE MANAGEMENT SYSTEM AND ADDITIVE MANUFACTURING FACILITY WITH SUCH

CROSS REFERENCE TO RELATED APPLICATIONS

This application is a United States National Phase Application of International Application PCT/EP2021/081388, filed Nov. 11, 2021, and claims the benefit of priority under 35 U.S.C. § 119 of German Application 10 2020 215 478.3, filed Dec. 8, 2020, the entire contents of which are incorporated herein by reference.

TECHNICAL FIELD

The present disclosure refers to a resource management system and an additive manufacturing facility with such a resource management system. In particular, the present disclosure relates to additive manufacturing facilities for serial production at an industrial scale, wherein the additive manufacturing facility comprises a plurality of additive manufacturing machines for parallel additive manufacturing of three-dimensional workpieces. More particularly, the additive manufacturing machines are preferably configured to apply laser powder bed fusion (LPBF) as the additive manufacturing technique.

BACKGROUND

Additive manufacturing of a three-dimensional workpiece is often referred to as 3D-printing. A specific form of additive manufacturing is laser powder bed fusion (LPBF), in which a layer of raw material powder is exposed to a high energy beam of electromagnetic radiation, such as, for example, a laser beam or a particle beam, for selectively sintering and/or melting particles of the raw material powder. The three-dimensional workpiece is manufactured by sequentially sintering and/or melting layer by layer of raw material powder.

Compared to conventional manufacturing techniques like moulding, additive manufacturing of a single three-dimensional workpiece consumes considerably more time. Therefore, in the early days of 3D-printing, additive manufacturing was only applied for prototyping or for a small number of individual pieces. However, as additive manufacturing offers the possibility to design and produce components that cannot be used by other conventional manufacturing techniques, there is a demand for using additive manufacturing for serial production at an industrial scale. The development of additive manufacturing over the last decades has reduced the production time per layer to a certain extent, for instance by using several lasers in parallel. However, the reduction of production time per layer is limited. Therefore, in order to use additive manufacturing for serial production at an industrial scale, components must be manufactured in parallel. For instance, a plurality of hundreds or thousands of smaller components can be arranged in a densely packed arrangement of components forming a three-dimensional workpiece that uses the available production volume to the best. However, also the maximum available production volume is limited. In order to use additive manufacturing for even more parallel processing, an additive manufacturing facility may comprise a plurality of additive manufacturing machines or process chambers. The number of additive manufacturing machines to be run in parallel is in principle unlimited.

As each additive manufacturing process needs certain resource material and/or resource items, it may be inefficient to provide the necessary infrastructure for the supply of resource material and/or resource items separately for each additive manufacturing machine. Typical resource material is, for example, one or more types of raw material powder that each manufacturing machine needs to be supplied with. Furthermore, each additive manufacturing machine needs at least one laser light source and shielding gas supply as resource material and/or resource items. The term "resource material and/or resource items" is to be understood broadly in the sense of everything that an additive manufacturing machine needs to be supplied with for a production process. For instance, a resource item may be a transportation slot in a common transportation system to move building chambers. It may often be efficient to provide a common infrastructure for the supply of resource material and/or resource items to a plurality of additive manufacturing machines. However, such a common infrastructure for the supply of resource material and/or resource items may require a certain management of the supply. For example, US 2018/0021855 A1 discloses a method for managing powder supply in an additive manufacturing facility comprising a plurality of machines.

US 2018/0021855 A1 suggests replacing an internal recycling system of each additive manufacturing machine as disclosed in U.S. Pat. No. 7,887,316 by a common powder recycling system for all additive manufacturing machines.

A common powder recycling system as proposed in US 2018/0021855 A1 has the problem that demand conflicts may arise when two additive manufacturing machines request powder and the common powder recycling system is only equipped to supply powder to only one additive manufacturing machine at a time. Therefore, the system described in US 2018/0021855 A1 cannot be operated at maximum efficiency and flexibility. For instance, an important powder supply in one machine may not be started until a less important powder supply to another machine is ongoing.

SUMMARY

It is therefore an object of the present disclosure to provide a resource management system for managing a supply of resource material and/or resource items to a plurality of at least two additive manufacturing machines for additive manufacturing that is more efficient and flexible than the systems known from the prior art.

According to a first aspect of the present disclosure, a resource management system for managing a supply of resource material and/or resource items to a plurality of at least two additive manufacturing machines for additive manufacturing is provided, wherein the resource management system comprises a control unit being configured to receive a signal indicative of a demand for resource material and/or resource items of any of the additive manufacturing machines, wherein the control unit is configured to schedule the supply of demanded resource material and/or resource items according to a predetermined prioritization scheme for resolving demand conflicts.

The term "resource material and/or resource items" shall be understood broadly to include one or more kinds of raw material powder, laser light from a one or more common laser light sources, shielding gas from a common shielding gas source, substrate plates from a common substrate plate depot, building chambers from a common building chamber depot, transport slots in a common transport system for any of the afore-mentioned resource materials/items, cool-down slots in a common storing system, e.g. slots in a building chamber depot station, unpacking slots in a common unpacking station, service (time-)slots from a common service source, e.g. an automatic service, cleaning and/or calibration apparatus or operating staff, and/or slots for necessary pre-treatment and/or post-treatment in common pre-treatment and/or post-treatment systems, e.g. slots in further conventional processing machines, such as sand-blasting, sawing, polishing, etching, milling, heating, auto-claving, galvanising, coating or the like. The demand-based resource management system according to the present dis-closure is more flexible to supply the demanded resource material and/or resource items to the individual additive manufacturing machines as needed. In case of demand conflicts, the scheduling of the supply of demanded resource material and/or resource items according to a predetermined prioritization scheme increases the efficiency, because the conflicting demands may be ranked according to predeter-mined criteria. For instance, the supply of an ongoing building job may be given a higher priority than a building job to be started. As another example, a request for unpack-ing a workpiece after a finished job may have a lower priority than providing a building chamber to an additive manufacturing machine for starting a new job.

Optionally, the resource management system may further comprise a supply system for supplying at least one kind of demanded resource material and/or resource items to the additive manufacturing machines in a manner scheduled by the control unit. For instance, the supply system may include a common vacuum transport pipe system for supplying the additive manufacturing machines with raw material powder. Alternatively, or in addition, the supply system may include a common shielding gas piping system connecting a com-mon shielding gas source to the additive manufacturing machines. The supply system may alternatively, or in addi-tion, comprise a common light guide system, e.g. lines of fibre optics, connecting a common laser source to one or more of the additive manufacturing machines. Alternatively, or in addition, the supply system may include a transporta-tion system for substrate plates and/or building chambers to be transported to/from a common building chamber depot station and/or a common unpacking station.

Optionally, the supply system may be configured to supply the at least one kind of demanded resource material and/or a resource items to a number of additive manufac-turing machines smaller than the total number of additive manufacturing machines at a time, in particular to only one additive manufacturing machine at a time. This allows for a less complicated and distributed supply infrastructure. As the processing time for additive manufacturing is often at least one order of magnitude higher than the time to supply resource material and/or resource items, more complicated supply systems allowing a parallel supply may result in an inefficient use of the supply system. It should be noted that certain resource materials and/or resource items are quite easy to supply in parallel, such as shielding gas. For those resource materials and/or resource items, the supply system is preferably configured to supply demanded resource mate-rial and/or resource items in parallel to two or more additive manufacturing machines at a time. As demand conflicts for those resource materials and/or resource items are less likely to occur, the scheduling according to a predetermined pri-oritization scheme is less important for those resource materials and/or resource items.

Optionally, the prioritization scheme may be based on a current severity ranking of the consequences for undersup-plying demanded resource material and/or resource items in a current operation state of the additive manufacturing machines. For instance, if an undersupply of raw material powder to a specific additive manufacturing machine, in which a manufacturing process (building job) is currently ongoing, would lead to an abortion of the job, the costs of such an abortion can be much higher than a delayed start of a new production process in another machine. As another example, supply of certain resource materials and/or resource items, such as the exchange of the building cham-ber before and after a job, may require a machine stop and/or manual intervention by operating staff. If such a demand is received during the night or the weekend, when no operating staff is present anyway, the severity ranking for undersupply may be lower than during normal working hours. So, the prioritization scheme may depend on different factors, such as daytime, availability of resource material and/or resource items, severity of undersupply, and/or predictions or opti-misation schemes. The control unit may, for instance, be programmed with machine learning algorithms to optimize the scheduling of resource demands.

Optionally, the control unit may be configured to stop an ongoing supply to a first one of the additive manufacturing machines for starting a supply to a second one of the additive manufacturing machines under the cumulative conditions that:

undersupplying the second additive manufacturing machine is inevitable without stopping the ongoing supply to the first chamber, and the current severity rank for undersupplying the second additive manufacturing machine is above a predeter-mined first severity threshold, and the current severity rank for undersupplying the first additive manufacturing machine is below a predeter-mined second severity threshold.

The first and second severity threshold may be indepen-dently set to different levels of severity or the same level of severity. The severity level may be determined on a con-tinuous or discontinuous scale. In a quite simple prioritiza-tion scheme, the severity may be grouped into "high sever-ity", "medium severity" and "low severity". Accordingly, the prioritization may be "high priority" for high severity, "medium priority" for medium severity and "low priority" for low severity. In this example, if the control unit receives a supply demand of a high priority due to a high severity rank, it stops, if that is unavoidable, an ongoing supply of lower priority. For instance, if the common vacuum piping system is currently used to fill a powder buffer of a machine for starting a new job, the ongoing filling process may be stopped by the control unit to prioritize refilling of a powder buffer of another machine that is in a currently ongoing job in order to prevent abortion of the ongoing building job.

Optionally, the resource material may be at least one raw material powder for being irradiated by electromagnetic or particle radiation in an additive manufacturing process at the additive manufacturing machines, and wherein the resource items are building chambers with a carrier on which three-dimensional workpieces are producible from the at least one raw material powder at the additive manufacturing machines. Preferably, the at least one type of raw material powder is distributed from a common raw material powder tank by a vacuum piping system. In case of using different types of raw material powders in parallel, separate piping tanks and vacuum piping systems may be needed for each type of raw material powder. Alternatively, powder may be distributed via cartridges delivered to the machines prefer-ably using the same transport system as for the building chambers. Particularly, powder cartridges may be designed as building chambers. Each building job for a three-dimensional workpiece may require a new carrier with a fresh substrate plate, on which the workpiece is produced. There may be a stock or depot of building chambers and carriers that can be reused for many building jobs. The carriers of the building chambers may be equipped with a fresh substrate plate for each building job.

Optionally, the resource material may be at least two raw material powders for being irradiated by electromagnetic or particle radiation in an additive manufacturing process at the additive manufacturing machines, wherein the at least two raw material powders comprise a first raw material powder and a second raw material powder, wherein the first raw material powder and the second raw material powder differ from each other by the type of material and/or particle size, wherein the supply system is configured to supply the first raw material powder and the second raw material powder separately to the additive manufacturing machine. Thereby, one or more of the additive manufacturing machines may be able to manufacture a three-dimensional workpiece comprising two or more different materials.

Optionally, the resource management system may further comprise a laser supply system for supplying laser light generated by one or more laser light sources to the additive manufacturing machines in a manner scheduled by the control unit, preferably taking into account that no laser radiation is needed during pre-processing, post-processing and servicing. It should be noted that the laser light guided by laser optics to the powder bed may comprise several laser-idle-times during a build job, e.g. when a new powder layer is being deposited on the powered bed, and/or between irradiation of vector hatches ("jumps") and/or between irradiation of single vectors ("skywriting"). When not all laser optics of an additive manufacturing machine can deflect their respective irradiation beams to the full powder bed, it may occur that the irradiation times cannot be distributed equally to all laser optics resulting in laser-idle-time for one or more laser optics. A common laser light source, comprising one or more equal or different laser sources, for one or more of the additive manufacturing machines may be more efficient than providing laser light sources individually for each of the additive manufacturing machines. If available at the production facility, other laser processing machines, like laser cutting machines, laser welding machines, laser marking machines, etc. could also be provided with laser light from the common laser light source. Laser light provided by the common laser light source may be distributed to different additive manufacturing machines or different laser optics considering their laser-idle-times. Additionally, or alternatively, the laser light may be distributed simultaneously or quasi-simultaneously to different additive manufacturing machines or different optics units, e.g. by splitting the laser light spatially (e.g. with beam splitters) and/or temporally (e.g. with pulsed laser sources). However, if the laser light of a common laser light source is shared among one or more of the additive manufacturing machines, the overall available light power may not be sufficient to satisfy all demands of a certain laser light at the same time. Therefore, the control unit may be configured to schedule the supply of demanded laser light according to a predetermined prioritization scheme for resolving laser light demand conflicts. The prioritization scheme may be the same or different from the prioritization scheme used for the supply of raw material powder. The common laser light source may comprise laser light sources with different wavelength, e.g. "infrared", "red", "green" and/or "blue" laser light sources. In manufacturing processes with different materials, it may be advantageous to use laser light with different wavelengths for the different materials. In a preferred embodiment, the additive manufacturing machines may comprise at least one first laser light source applicable that is suitable for processing broad range of materials, e.g. a "red" or "infrared" laser light source, and at least one second laser light source that is suitable for processing less common materials, e.g. a "green" or "blue" laser light source, wherein usage of the first and the second laser light source are suited to be scheduled by the resource management system among the additive manufacturing machines. Alternatively, or in addition, the common laser light source may comprise laser light sources with different power and/or operation modes, e.g. continuous wave mode or pulsed mode.

According to a second aspect of the present disclosure, an additive manufacturing facility is provided, wherein the additive manufacturing facility comprises a plurality of at least two additive manufacturing machines for parallel additive manufacturing of three-dimensional workpieces, and a resource management system as previously described for managing a supply of resource material and/or resource items to said plurality of at least two additive manufacturing machines.

Optionally, the additive manufacturing facility may further comprise an unpacking station for unpacking a three-dimensional workpiece from a building chamber and removing residual raw material powder from the three-dimensional workpiece. Preferably, the additive manufacturing facility comprises a common transport system for building chambers to be transported from any of the additive manufacturing machines to the unpacking station.

Optionally, the additive manufacturing facility may further comprise a building chamber depot station for parallel pre-treatment and/or post-treatment of a plurality of building chambers. For instance, the building chambers and carriers thereof may be, as a pre-treatment, pre-heated to a desired operational temperature for starting a new building job. A typical post-treatment of a building chamber after a finished building job could be a controlled cooling, which includes controlled heating to prevent a too rapid cool-down process. On the one hand, a too rapid cool-down process may lead to undesirable material stress for the three-dimensional workpiece that was just manufactured. On the other hand, a too slow cool-down process increases the overall manufacturing time and costs per workpiece. Therefore, the control unit may schedule demanded vacancy slots in the building chamber depot station for pre-treatment and/or post-treatment according to the prioritization scheme. The prioritization scheme may depend on certain sensor output, e.g. temperature sensor output. For instance, a first machine and a second machine are both requesting for their building chambers a cool-down slot in the building chamber depot station after a finished job. A temperature sensor in the first building chamber may indicate a higher temperature than a temperature sensor in the second building chamber. If only one slot is currently available in the building chamber depot station, the hotter building chamber may be prioritised. Depending on the temperature of other building chambers in the building chamber depot station, the control unit may free a slot of a cooler building chamber to allow a cool-down of a hotter building chamber. Optionally, the tendency of thermal deformation of the different build jobs may be taken into consideration, determined from the build file. A cool-down process may be given priority above any warm-up process, because the severity of a quality degradation of the workpiece may be higher than a delayed start of a new building job. Therefore, a warm-up process may be stopped if it is necessary to free a slot in the building chamber depot station for a cool-down process.

Optionally, the at least one of the additive manufacturing machines may comprise an internal raw material powder recycling system, wherein the internal raw material powder recycling system is configured to directly recycle residual raw material powder during an ongoing manufacturing process (building job). It is advantageous to directly recycle residual raw material powder within a machine during an ongoing manufacturing process for using the machine more efficiently. As each layer of raw material powder requires a substantial amount of excess raw material powder being scraped off each layer during the layering process, an internal raw material powder recycling system increases significantly the production capacity of a machine. A machine with an internal raw material powder recycling system needs less and fewer refilling of raw material powder and therefore sends less and fewer demands to the resource management system. However, an internal raw material powder recycling system could make the demand for raw material powder of a machine less predictive, which increases the chance of demand conflicts and demand conflict resolution.

Optionally, at least one of the additive manufacturing machines comprises at least one raw material powder buffer for buffering raw material powder, wherein the at least one raw material powder buffer comprises a filling level detector configured to trigger a signal indicative of a demand for raw material powder as resource material. Preferably, the at least one raw material powder buffer may be configured to receive directly recycled residual raw material powder from the internal raw material powder recycling system during an ongoing manufacturing process. So, the raw material powder buffer may be refilled on the one hand via a common raw material powder transportation system, e.g. a vacuum piping system, connecting a raw material powder tank with the individual raw material powder buffers of the additive manufacturing machines of the facility. On the other hand, each of the raw material powder buffers may be refilled directly during an ongoing manufacturing process by the internal raw material powder recycling system of each machine. The filling level detector may comprise one or more sensors, e.g. one or more light-sensitive sensors at a specific vertical position at or in the raw material powder puffer. In order to detect a rate of raw material powder consumption, two or more sensors may be provided at distinctive vertical positions. A future raw material powder demand may be predicted and thus scheduled by the control unit according to the predetermined prioritization scheme for resolving demand conflicts. Alternatively, or in addition, the resource management system may offer a selectable option for a user to set a recycling fraction, or a selectable operating mode without direct recycling, i.e. with fresh raw material powder only. Preferably, a user may even be able to demand that the fresh raw material powder must originate from a single charge of fresh raw material powder.

Optionally, the resource management system may further be configured to predict one or more demands for resource material and/or resource items of any of the additive manufacturing machines and to reschedule the supply of said predicted demands of resource material and/or resource items according to the predetermined prioritization scheme for resolving demand conflicts. For instance, the resource management system may have access to the build data, i.e. build files, on the basis of which three-dimensional workpieces are being manufactured or planned to be manufactured. Any relevant machine parameters and/or operating states and/or operating modes may also be known.

The resource management system may thus be able to predict which resource will be needed by which machine at what time. Furthermore, the resource management system may also be able to predict from which point in time which resource will not be needed anymore by which machine. So, the supply of predicted demands of resource material and/or resource items may be rescheduled according to the predetermined prioritization scheme for resolving predicted demand conflicts. For instance, a machine may be commanded to eject its recycled residual raw material powder for being supplied with a full new load of fresh raw material powder before the next build job in order to avoid any demand during the next build job. Another example may be that a cool-down slot is predicted to be needed soon, but no slot will then be available in the building chamber depot station. So, the resource management system may demand to transport a not yet fully warmed-up, i.e. "cold" building chamber from the building chamber depot station to a machine and to warm it up in the machine. This empties the slot that is predicted to be needed. A further example is that a build job is predicted to finish during a weekend, when no staff is available to clean the machine thereafter. The speed, fault risk and/or quality of the build job may be adapted accordingly by the resource management system, or vice versa, those build jobs that need a higher quality, lower fault risk and/or longer building time may be scheduled to run over the weekend. As certain reconfiguration and servicing work, e.g. filter exchange, may be needed for certain build jobs, such reconfiguration and servicing work may be minimised by scheduling groups of build jobs between which no or less reconfiguration and servicing work is needed, e.g. using the same raw material power(s) to save numbers of filter exchanges. Also, similar or identical build jobs in parallel on machines may be scheduled in groups, because the pre-processing and post-processing is similar or the same.

According to a third aspect of the present invention, a method for managing a supply of resource material and/or resource items to a plurality of at least two additive manufacturing machines for additive manufacturing is provided, wherein the method comprises:

receiving a signal indicative of a demand for resource material and/or resource items of any of the additive manufacturing machines, and scheduling the supply of demanded resource material and/or resource items according to a predetermined prioritization scheme for resolving demand conflicts.

Optionally, the method may further comprise triggering the signal indicative of a demand for resource material and/or resource items manually by a request input of operating staff or automatically on the basis of a sensor detection or sensor measurement. Operating staff may set a variety of parameters and threshold levels for the automatic triggering requests for supply of resource material and/or resource items.

Optionally, the prioritization scheme may be based on a current severity ranking of the consequences for undersupplying demanded resource material and/or resource items in a current operation state of the additive manufacturing machines. For instance, if an undersupply of raw material powder would lead to an abortion of the ongoing building job, the current severity ranking may be highest. Therefore, the prioritization scheme would prioritize, for instance, the raw material powder supply to a machine that is currently manufacturing a workpiece rather than supplying a machine with raw material powder for starting a new building job.

Optionally, the scheduling of the supply may comprise stopping an ongoing supply to a first one of the additive manufacturing machines for starting a supply to a second one of the additive manufacturing machines under the cumulative conditions that:

undersupplying the second additive manufacturing machine is inevitable without stopping the ongoing supply to the first additive manufacturing machine, and the current severity rank for undersupplying the second additive manufacturing machine is above a predetermined first severity threshold, and the current severity rank for undersupplying the first additive manufacturing machine is below a predetermined second severity threshold. For instance, a raw material buffer of a first machine is currently filled with raw material powder for starting a new building job. During this filling process, another currently manufacturing second machine may demand the supply of new raw material powder for continuing the ongoing manufacturing process. As the severity rank of an abortion of a currently ongoing manufacturing process is higher than the delay of the start of a new manufacturing process, the filling of the raw material buffer of the first machine is stopped in order to supply the second machine with raw material powder and thereby preventing an abortion of the currently ongoing manufacturing process in the second machine.

Optionally, the method may further comprise directly recycling residual raw material powder during an ongoing manufacturing process. As already stated above, this improves the overall efficiency for using the available raw material powder and increases the capacity of each machine provided with an internal powder recycling system.

Optionally, the method may further comprise:

buffering raw material powder for at least one of the additive manufacturing machines in a raw material powder buffer of said at least one additive manufacturing machine, monitoring a filling level of the raw material powder buffer, and triggering a signal indicative of a demand of said at least one additive manufacturing machine for raw material powder as resource material.

Optionally, the method may further comprise directly recycling residual raw material powder during an ongoing manufacturing process at said at least one additive manufacturing machine into the associated raw material powder buffer. Alternatively, or in addition, a user may set a recycling fraction or suspend direct recycling completely, i.e. to manufacture with fresh raw material powder only. Preferably, a user may even demand that the fresh raw material powder must originate from a single charge of fresh raw material powder.

Optionally, the method may further comprise predicting one or more demands for resource material and/or resource items of any of the additive manufacturing machines and rescheduling the supply of said predicted demands of resource material and/or resource items according to a predetermined prioritization scheme for resolving demand conflicts. Any relevant machine parameters and/or operating states and/or operating modes may be known. Additionally, all information contained in the build data are accessible, i.e. build files, on the basis of which three-dimensional workpieces are being manufactured or planned to be manufactured.

It is therefore possible to predict which resource will be needed by which machine at what time. Furthermore, it is possible to predict from which point in time which resource will not be needed anymore by which machine. So, the supply of predicted demands of resource material and/or resource items may be rescheduled according to the predetermined prioritization scheme for resolving predicted demand conflicts. For instance, a machine may be commanded to eject its recycled residual raw material powder for being supplied with a full new load of fresh raw material powder before the next build job in order to avoid any demand during the next build job. Another example may be that a cool-down slot is predicted to be needed soon, but no slot will then be available building chamber depot station. So, the resource management system may demand to transport a not yet fully warmed-up, i.e. "cold" building chamber from the building chamber depot station to a machine and to warm it up in the machine. This empties the slot that is predicted to be needed. A further example is that a build job is predicted to finish during a weekend, when no staff is available to clean the machine thereafter. The speed, fault risk and/or quality of the build job may be adapted accordingly by the resource management system, or vice versa, those build jobs that need a higher quality, lower fault risk and/or longer building time may be scheduled to run over the weekend. As certain reconfiguration and servicing work, e.g. filter exchange, may be needed for certain build jobs, such reconfiguration and servicing work may be minimised by scheduling groups of build jobs between which no or less reconfiguration and servicing work is needed, e.g. using the same raw material powder(s) to save numbers of filter exchanges. Also, similar or identical build jobs in parallel on machines may be scheduled in groups, because the preprocessing and post-processing is similar or the same.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a schematic representation of an example of a dashboard display of a resource management system according to the present disclosure;

DESCRIPTION OF PREFERRED EMBODIMENTS

Figure 1:
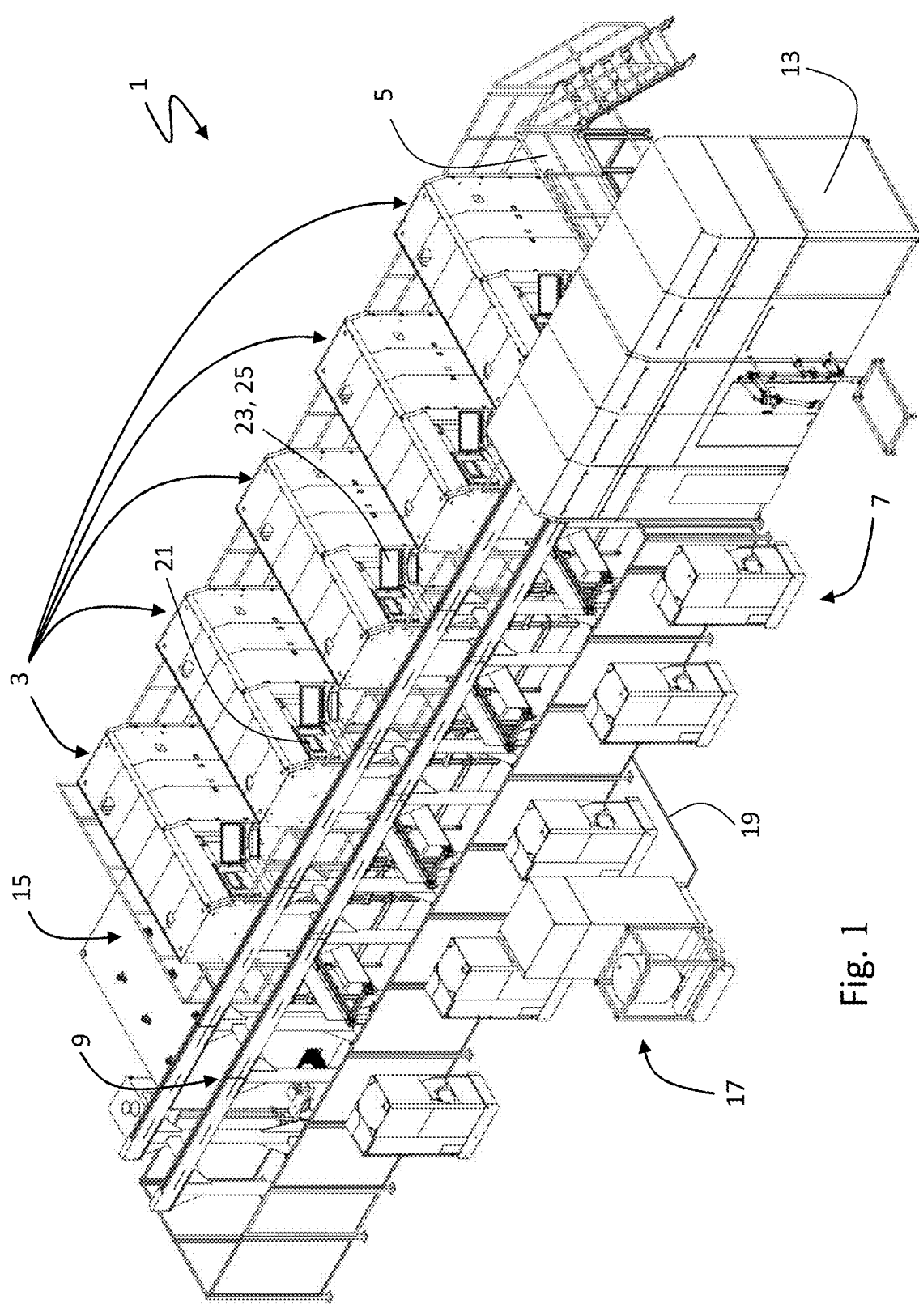
FIG. 1 is a perspective view of an example of an additive manufacturing facility according to the present disclosure.
Figure 2:
FIG. 2 is a top view of the additive manufacturing facility of FIG. 1.

Referring to the drawings, FIGS. 1 and 2 show an additive manufacturing facility 1 comprising a plurality of five additive manufacturing machines 3. Please note that the number of five machines 3 is arbitrarily chosen for this example and the additive manufacturing facility 1 may comprise any number n≥2 of additive manufacturing machines 3. Some or all of the additive manufacturing machines 3 may be identical or differ from each other in certain aspects. The advantage of identical additive manufacturing machines 3 in a parallel configuration as shown in FIGS. 1 and 2 may be advantageous to perform high-quantity additive manufacturing in a serial production at an industrial scale. The additive manufacturing facility 1 may be capable of manufacturing thousands of components in parallel if one of the additive manufacturing machines 3 is capable of manufacturing hundreds of components in parallel in a single building job. If one, some or all of the additive manufacturing machines 3 differ from each other by certain aspects, the additive manufacturing facility 1 may be more versatile for producing a wider range of products. For instance, one or some of the additive manufacturing machines 3 may be capable of manufacturing components comprising two different materials.

The additive manufacturing machines 3 are located on an elevated platform in parallel and distanced to each other in a row configuration in order to allow access to each additive manufacturing machine 3 for operating staff. The additive manufacturing facility 1 further comprises a supply system 7 for supplying resource material and/or resource items to the additive manufacturing machines 3. As part of the supply system 7, a transport system 9 extends along the row of additive manufacturing machines 3 in order to transport building chambers 11 to and from the additive manufacturing machines 3. The elevation of the platform 5 allows a transport to and from the additive manufacturing machines 4 at a level below the platform 5 and/or an installation of machines 3 with high building chambers 11 without the necessity of foundation work. Thereby, building chambers 11 with a height of more than 80 centimetres can be used for the additive manufacturing machines 3. In FIGS. 1 and 2, one building chamber 11 is currently shown on a path to or from one of the additive manufacturing machines 3. The transport system 9 is able to transport the building chambers 11 along the row of additive manufacturing machines 3 on a linear rail. The transport system 9 is further configured to move and position the building chamber 11 vertically up and down. Furthermore, the transport system 9 is able to transport building chambers 11 into the additive manufacturing machines 3 for mounting them to the process chambers of the additive manufacturing machines 3.

The additive manufacturing facility 1 further comprises an unpacking station 13, which may also be referred to as powder removal station. The unpacking station 13 is used to unpack the building chambers 11 after a finished building job in order to remove any non-melted or non-sintered raw material powder from the manufactured workpiece. Such residual raw material powder may be recycled and reused after collecting, sifting, filtering, drying and/or other treating of the residual raw material powder. As shown in FIGS. 1 and 2, the unpacking station 13 may be located at one end of the linear rail of the transport system 9. At the other end of the linear rail of the transport system 9, the additive manufacturing facility 1 may further comprise a building chamber depot station 15 for storing and buffering building chambers 11 before and/or after a building job. The shown positioning at the ends of the transport system 9 is only an example. Preferably, the number and arrangement of the machines 3 may be taken into account for the positioning to offer optimal transport routes. Several unpacking stations 13 and several depot stations 15 may be provided. The building chamber depot station 15 may be used for pre-treatment and/or post-treatment of the building chambers 11. For example, the building chambers 11 may be heated up to a processing temperature before they are transported to the additive manufacturing machines 3 for the next building job. Alternatively, or in addition, the building chambers 11 may be cooled down at the building chamber depot station 15 in a controlled manner after the manufacturing process. A controlled cool-down process may comprise heating of the building chambers 11 in order to slow down the cooling time for avoiding thermally induced structural stress in the manufactured workpiece. Alternatively, or additionally, the operating staff may use a remote control terminal, e.g. a personal computer, to monitor and control the build jobs for some or all additive manufacturing machines, preferably for the whole manufacturing facility.

The additive manufacturing facility 1 further comprises a common raw material powder supply 17, from which raw material powder is delivered to the additive manufacturing machines 3 via a vacuum piping system 19. The common raw material powder supply 17 comprises a raw material powder tank and optionally a filter and/or sieve for purifying the raw material powder before delivery to the additive manufacturing machines 3. The raw material powder tank may be filled with new raw material powder from an external source and/or with recycled raw material powder from the unpacking station 13. One, some or all of the additive manufacturing machines 3 may comprise an internal recycling system for recycling raw material powder that is used in excess of depositing each layer during the manufacturing process. Alternatively, or in addition, the excess raw material powder of one, some or all of the additive manufacturing machines 3 may be recycled via the common raw material powder source via one or more return lines of the vacuum piping system 19. The vacuum piping system 19 may comprise one or more suction pumps for providing an under pressure driving a gas flow through the vacuum piping system 19 carrying the raw material powder. The additive manufacturing facility 1 comprises a common source of shielding gas, e.g. nitrogen or argon, to supply shielding gas to the additive manufacturing machines 3. The additive manufacturing machines 3 may each comprise one or more process chambers for additive manufacturing. In the example shown in FIGS. 1 and 2, each additive manufacturing machine 3 comprises exactly one process chamber. Before an additive building job can be started, a building chamber 11 must be mounted from below to the process chamber of an additive manufacturing machine 3. Operating staff standing on the platform 5 at any one of the additive manufacturing machines 3 is able to look into the process chamber of the respective additive manufacturing machine 3 through a window 21. The additive manufacturing machines 3 may comprise a monitoring and control terminal 23 including a display 25 and input means. Operating staff may use the monitoring and control terminal 23 of the additive manufacturing machines 3 to monitor and control the building job individually for the respective additive manufacturing machine 3.

A complete production cycle of the additive manufacturing facility 1 starts with an assembly of one or more building chambers 11, which are resource items for the additive manufacturing process. A building chamber 11 comprises a carrier in form of a bottom plate package, a circumferential side wall, and a lid. The carrier comprises a top substrate plate on which the workpiece is later build or "grown". Furthermore, the carrier comprises heating elements and fixation points for temporary fixing the carrier from below. The carrier is axially movable within the circumferential side wall and can be locked in a bottom position. The carrier thereby sealingly closes the building chamber 11 from below. The lid is used to sealingly close the building chamber 11 at the top. The lid comprises shielding gas connectors for connecting to a shielding gas supply in order to provide a sufficient shielding gas atmosphere in the building chamber 11 when needed.

Once the carrier, the circumferential side wall and the lid are assembled together, the building chamber 11 is warmed-up in the building chamber depot station 15. Once the building chamber 11 is warmed-up to a pre-determined or set processing temperature, the building chamber 11 is ready to be assigned to and transported to one of the additive manufacturing machines 3. According to an optional aspect of the invention, it is also possible to warm-up the building chamber 13 in the additive manufacturing machine 3 instead of the building chamber depot station 15. Although the warm-up in the machine may need a longer time, a warm-up in the machine 3 may be commanded by the resource management system, e.g. if a slot in the building chamber depot station 15 is needed for an action with higher priority, such as a cool-down. When the building chamber 11 reaches the respective additive manufacturing machine 3, it is positioned below the process chamber of the machine 3. The lid is then taken off and the circumferential side wall can be sealingly attached to the process chamber from below. The process chamber is opened towards the building chamber and the carrier is moved upward to a top position. Thereby, a first layer of raw material powder can be deposited by a feeder on the substrate plate for additive manufacturing in the process chamber. The described docking process is only an example. It is also possible that the building chamber 13 and/or the process chamber are opened and closed in a different manner. In particular, it is possible that the building chamber lid and the process chamber cover are jointly moved and/or the building chamber lid may be moved inside the process chamber.

The successive layer-by-layer irradiation process of the raw material powder starts while a sufficient shielding gas atmosphere is prevalent in the process chamber. After each finished laser irradiation of a layer, the carrier is moved stepwise downward within the circumferential side wall of the building chamber 11 by one layer thickness. A new layer is then deposited by the feeder on the previously irradiated layer, so that the top layer to be irradiated is always at the same axial position in the process chamber. Thereby, the manufactured workpiece "grows" into the building chamber 11 attached to the process chamber form below. At the end of the building job, the building chamber 11 is filled with the manufactured workpiece and residual non-melted or non-sintered raw material powder of all layers. It should be noted that the deposition of a new layer requires excess raw material powder that is scraped off by a scraper to achieve a plane layer of a desired thickness. The excess raw material powder may be recycled in an internal recycling system of the machine 3 and/or a common recycling system of the facility 1. Optionally, the recycled powder may be mixed with fresh powder in a fixed or variable ratio, preferably in such a ratio that a predetermined minimum amount of fresh powder is used. In case of an internal recycling system of the machine 3, the excess raw material powder is sifted and transported back into a raw material powder buffer of the machine 3, from which the feeder gets the raw material powder for new layer depositions. In case of a common recycling system of the facility 1, the excess raw material powder is transported back to the common raw material powder tank of the common raw material powder supply 17 via the vacuum piping system 19. The raw material powder buffer of the machine 3 is connected to the vacuum piping system 19 to be filled with new and/or recycled raw material powder.

Once the building job is finished, the process chamber is closed to retain a shielding gas atmosphere therein for the subsequent building job. The building chamber is moved downward to separate from the process chamber and the lid is put back on the circumferential side wall to close the building chamber at the top and to retain the shielding gas atmosphere therein as much as possible. The process chamber may be manually or automatically cleaned from residual raw material powder for the subsequent building job. Preferably, a connection to a gas supply is established to ensure a sufficient shielding atmosphere during cool down.

After the building job, the building chamber 11 needs to cool down in a controlled manner and a cool-down slot in the building chamber depot station 15 is requested. Once a cool-down slot in the building chamber depot station 15 is available, the building chamber 11 is transported to the building chamber depot station 15, where the carrier is fixed from below in a parking lot. The heating element in the parked carrier is thereby controllable to control the cool-down duration to reduce the risk of temperature-induced material stress in the workpiece.

Once the building chamber 11 is cooled down sufficiently, the building chamber 11 is ready to be unpacked in the unpacking station 13. Once an unpacking slot on an unpacking table in the unpacking station 13 is available, the building chamber 11 is transported to the unpacking station 13. In the unpacking station 13, the carrier is fixed to an unpacking table from below in essentially the same way as in the parking lot of the building chamber depot station 15. In contrast to the building chamber depot station 15, the unpacking table is located in a sealed unpacking room to prevent leakage any of raw material powder. Once the carrier is fixed to the unpacking table, the circumferential side wall including the lid is moved upward and "pulled off" the workpiece. The residual non-melted and non-sintered raw material powder around the workpiece then falls off and rinses into a bottom catch basin of the unpacking station 13. In order to remove as much residual non-melted and non-sintered raw material powder off the workpiece as possible, the unpacking table can be shaked, vibrated, and/or rotated within the unpacking room. It should be noted that the bottom layers of the workpiece are preferably melted/sintered to the substrate plate, so that the workpiece is integrally connected to the substrate plate being part of the carrier.

After unpacking of the building chamber 11, the circumferential side wall including the lid may be put back on the carrier to allow transportation by the transport system 9 and to protect the workpiece during transportation. Once the building chamber 11 has left the unpacking station 13, the building chamber 11 is disassembled again and the substrate plate is separated from the carrier in order to retrieve the workpiece for further external conventional processing, such as sandblasting, milling, heating, autoclaving, galvanising, coating or the like.

The emptied building chambers 11 can be reused and reassembled for the next complete production cycle of the additive manufacturing facility 1. The only part of the building chamber 11 that needs to be replaced for each production cycle is the substrate plate that needs to be mounted on the carrier. Individual, some or all build jobs may be carried out as so called "support-free" build jobs. This means that the workpiece is produced in a manner that no connection to the substrate plate is produced, so that the workpiece is "floating" on the raw material powder. In this case, the substrate plate has not to be changed and/or the use of a substrate plate may be dispensed with altogether. When running without substrate plate, the building chamber 11 may have a specific design, especially the carrier. Support free build jobs may also need the use of a different unpacking station, e.g. comprising a workpiece gripper and/or a sieve, in particular a vibrating sieve, for not disposing the workpieces with the residual powder. The resource management system may take into account necessary unpacking requirements of the individual build jobs.

In order to coordinate and manage the production cycles of the additive manufacturing facility 1 with a plurality of building chambers 11 and additive manufacturing machines 3 in parallel, the additive manufacturing facility 1 further comprises a resource management system (not visible in FIGS. 1 and 2) in form of software or an application implemented on programmable logic controller (PLC), an industrial PC (IPC), a server or another kind of computer device for controlling the supply system 7 of the additive manufacturing facility 1. The input and output options for the resource management system may be displayed, in form of a dashboard (see FIG. 3), on any of the displays 25 and/or a display of another stationary or mobile computer device, e.g. a tablet or smartphone. The dashboard may be implemented as a web-based application that can be displayed by using an ordinary internet browser application. In terms of hardware, the resource management system comprises a control unit being configured to receive signals indicative of a demand for resource material and/or resource items of any of the additive manufacturing machines 3. The control unit is further configured to schedule the supply of demanded resource material, e.g. raw material powder, common laser light, shielding gas, and/or resource items, e.g. building chambers 11, transportation slots, cool-down slots, warm-up slots, unpacking slots, according to a predetermined prioritization scheme for resolving demand conflicts. Any parameters or settings for the prioritization scheme to be applied may be set by operating staff using the dashboard as displayed. The control unit may also be configured to communicate demands, statuses, error massages, sensor measurements or any other monitoring information to be displayed to the operating staff on the dashboard.

FIG. 3 shows an example of a dashboard 27 as it is displayed to operating staff on any one of the displays 25 and/or a display of another stationary or mobile computer device. The dashboard 27 comprises an information overview about the status of the unpacking station 13 that is referred to as "SLM® PRS Powder Removal Station", about the status of the building chamber depot station 15 referred to as "SLM® BCM Build Cylinder Magazine", and about the status of the individual additive manufacturing machines 3 referred to as "SLM® 800 M1-M5". The building chambers 11 are referred to as "build cylinders". The dashboard may comprise graphical status representations for the individual stations and machines, e.g. in form of a colour code, e.g. traffic lights. In particular, some or all graphical status representations may match to physical status representations on the stations 13, 15 and machines 3, e.g. signal lights.

As can be seen from the dashboard 27, all additive manufacturing machines M1 to M5 are here of the same type "SLM® 800", which uses four lasers simultaneously during a building job on a powder bed size of 500×280 millimetres. The building chambers 11 have a height of 850 millimetres. The building rate can be 170 cm³/h or higher. In the situation shown as an example in FIG. 3, Machines M2 and M3 have a currently ongoing build job, whereas machines M1, M4 and M5 have finished build jobs. The building chambers 11 in machines M1, M4 and M5 hold the manufactured workpiece therein and are ready to be moved to the building chamber depot station 15 to be cooled down. Operating staff may now trigger a request for cool-down slot by pressing the respective request button 27, e.g. on a touch-screen of a tablet displaying the dashboard 29. Alternatively, the resource management system may automatically trigger the request and schedules the execution. The scheduling is of the execution is needed in case of demand conflicts. For instance, the building chamber depot station 15 (SLM® BCM Build Cylinder Magazine), has currently only one empty slot available for another cool-down process. The resource management system may prioritise moving one of the building chambers 11 in machines M1, M4 or M5, for instance of M1, to the empty slot in the building chamber depot station 15.

There are then in principle two options for the resource management system to allocate the next slot of the transport system 9 that is only able to transport one building chamber 11 at a time. A first option is to move the building chamber 11 in the building chamber depot station 15 that is ready to unpack to the unpacking station 13 ("SLM® PRS Powder Removal Station") in order to free another slot in the building chamber depot station 15. A second option is to move the warned-up building chamber 11 in the building chamber depot station 15 that is ready to be assigned to the then empty machine M1. The second option is more efficient, because the first option would delay the start of new build job in machine M1. This decision-making process is pre-determined by the prioritization scheme that is applied to resolve demand conflicts, e.g. in this case about a transportation slot.

Once the building chamber is moved to machine M1, the building chamber 11 in the building chamber depot station 15 that is ready to unpack is moved to the unpacking station 13, because no building chambers 11 in the building chamber depot station 15 is fully warmed-up and ready to be assigned to a new build job. Then, two cool-down slots in the building chamber depot station 15 a free for the building chambers 11 in machines M4 and M5, which are then moved to the building chamber depot station 15 accordingly.

The resource management system also manages and displays the raw material powder supply or distribution. In the situation as shown in FIG. 3, the machines M1, M4 and M5 have full raw material powder buffers and have no current demand for raw material powder supply. Machines M2 and M3, however, have a low filling level or empty raw material powder buffers and have thus a conflicting demand for raw material powder supply. The supply system 7 may only be able to supply raw material powder to one machine at a time. The raw material powder buffer of machine M3 is currently being filled as indicated by the status display "loading . . . ". If the current undersupply of machine M2 would lead in projection to an abortion of the ongoing build job in machine M2, the resource management system may decide to stop the filling process of machine M3 to start filling machine M2. Thereby, a costly job abortion can be prevented. If then the current undersupply of machine M3 would lead in projection to an abortion of the ongoing build job in machine M3, the resource management system may decide to stop the filling process of machine M2 to start filling machine M3 again.

Figure 4:
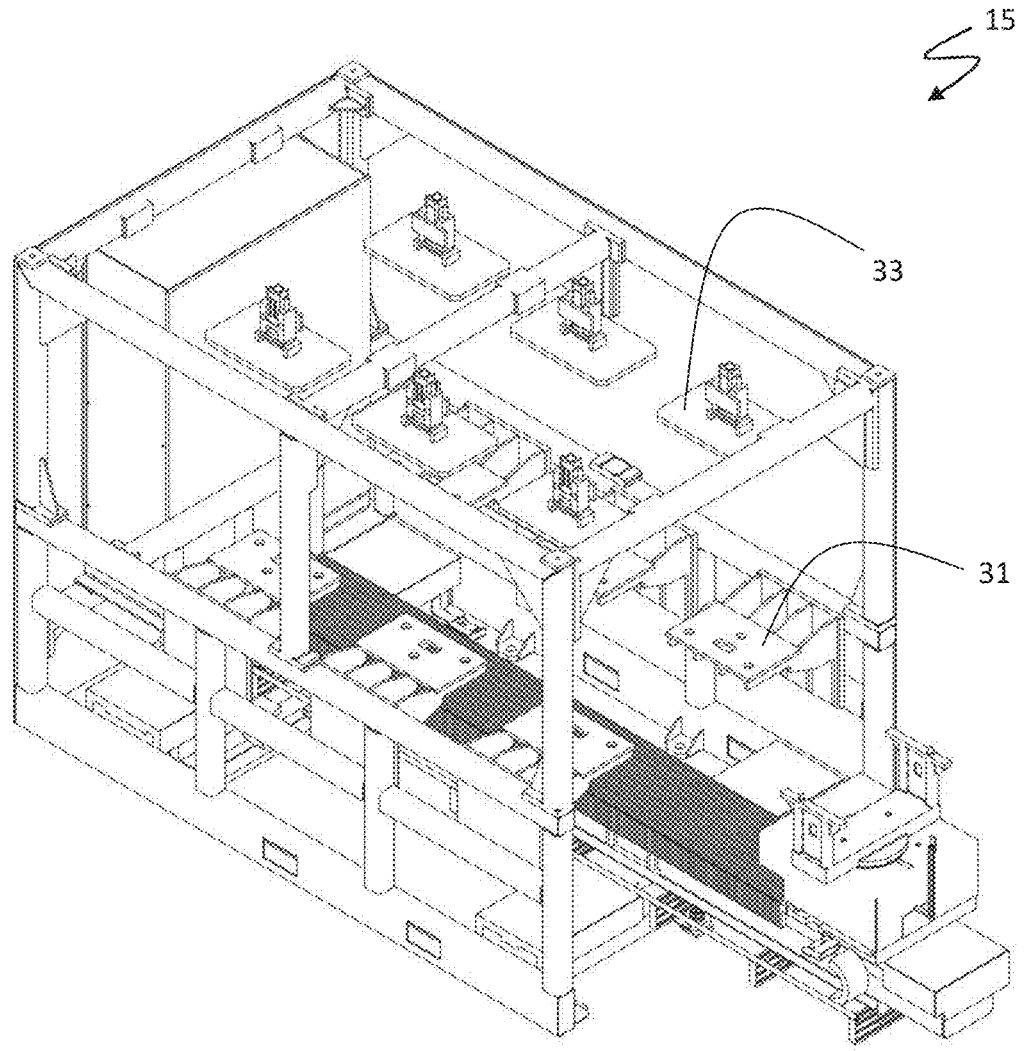
FIG. 4 is a perspective view of an example of a building chamber depot station of an additive manufacturing facility according to the present invention.

FIG. 4 shows the building chamber depot station 15 in more detail. As can be seen in FIG. 4, the building chamber depot station 15 comprises six parking lots 31 in order to accommodate six building chambers 11 at a time. The building chambers 11 are automatically mountable to the parking lots 31. The building chamber depot station 15 is connected to the transport system 9 for receiving and sending building chambers 11. Once a building chamber 11 is mounted to a parking lots 31, the control unit is able to control a heating element in the carrier, i.e. the bottom plate package, of the building chamber 11. From above, each parking lot 31 comprises a shielding gas supply 33 in order to provide for a sufficient shielding gas atmosphere during longer periods of cool-down, warm-up and/or parking of building chambers 11. Nitrogen or argon may for instance be used as shielding gas.

Figure 5:
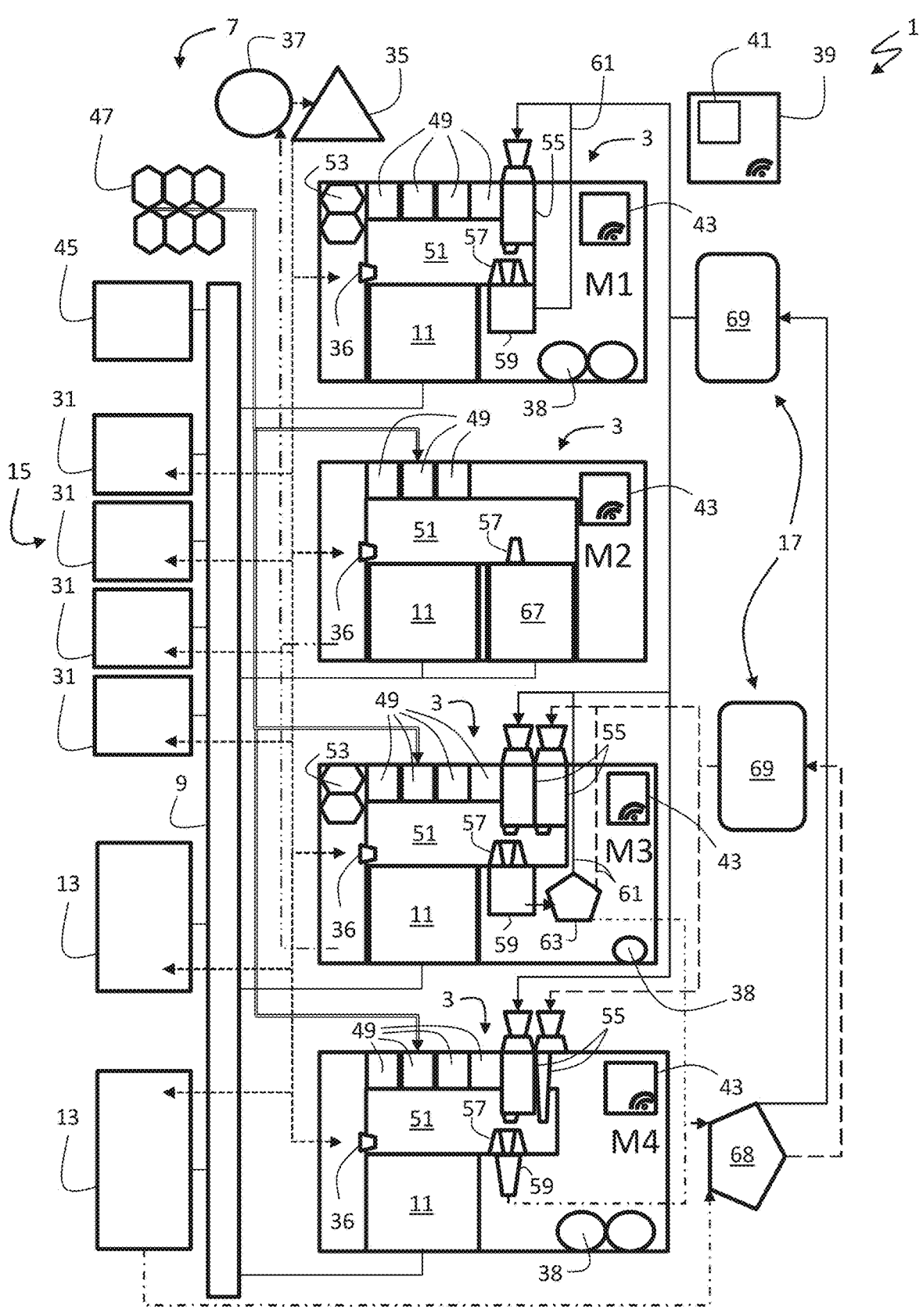
FIG. 5 is a schematic representation of another example of an additive manufacturing facility according to the present disclosure.

FIG. 5 shows another example of an additive manufacturing facility 1 comprising four different additive manufacturing machines 3 labelled M1, M2, M3 and M4. There is central common shielding gas source 35 for all additive manufacturing machines 3 and stations 13, 15. The shielding gas is circulated in cycled piping system to be fed into all machines 3 via shielding gas supplies 36 and filtered in a common filter unit 37. Additional filters 38 with the same or different efficiency may be provided in the individual additive manufacturing machines 3, i.e. large filter units 38 in machines M1 and M4, and small filter unit 38 in M3. The common filter unit 37 and the individual filter units 38 may comprise multiple filters, especially for filtering different material compositions. It is also possible that more than one shielding gas circuits are used. In particular, one gas circuit for each raw material composition may be used, whereby critical material combinations in the filter are prevented. A resource management system 39 comprising a control unit 41 is connected wirelessly or by wire to internal control modules 43 of each machine 3. The control unit 41 of the resource management system 39 is configured to coordinate and manage the supply system 7 of the additive manufacturing facility 1. There are several options how to implement the communication between the resource management system 39 and the control modules 43. In a first option, the resource management system 39 may receive unprocessed data and control signals from the control modules 43 for the resource management system 39 to interpret and evaluate. In a second option, the control modules 43 process and evaluate their data and sensor signals individually and send only demands for resource material and/or resource items to the resource management system 39. In a preferred third option, the control modules 43 process their data and sensor signals individually and forwarded them to the resource management system 39 for the resource management system 39 to evaluate and prioritise. The supply system 7 here comprises a transport system 9 for transporting building chambers 11, a building chamber depot station 15 with four parking lots 31, an unpacking station 13 with one unpacking table, a terminal hub 45 for delivering workpieces and reception of new building chambers 11 or carriers, a laser supply system 47, and a common raw material powder supply 17 for providing two different kinds of raw material powder. The two types of raw material powder may differ from each other by their type of material and/or particle size. The material types may be any types of metal, ceramics, plastics, and/or minerals. Thereby, different materials can be used in one building job. For instance, a workpiece comprising two different materials may be manufactured. As another example, plastic may be used as relatively cheap and light filling or bridging material that can be burned away later or ceramics may be used as a coating.

The four machines 3 of the additive manufacturing facility 1 shown as an example in FIG. 5 differ from each other in certain aspects to demonstrate the versatility of the additive manufacturing facility 1. Machine M1 comprises four laser optics 49 at the top of a process chamber 51 and two internal laser light sources 53. Machine M1 further comprises one raw material powder buffer 55 at a side of the process chamber 51. A feeder 57 positioned below the raw material powder buffer 55 can be filled with raw material powder from the raw material powder buffer 55. The feeder 57 is horizontally movable to deposit and scrape a layer of raw material powder on the carrier of a building chamber 11 being positioned below the process chamber 51. Excess raw material powder being scraped off after depositing each layer is pushed by the feeder 57 into a catch basin 59. The excess raw material powder is directly recycled to the raw material powder buffer 55 during a building job via an internal recycling system 61.

The laser supply system 47 is used to provide laser light for machines M2, M3, and M4, of which only machine M3 comprises an additional internal laser light source 53. The laser light of one or more common laser light sources of the laser supply system 47 is guided to the machines M2, M3, and M4 by a light guide system 65, e.g. lines of fibre optics. The laser supply system 47 may provide different types of laser light that differ by wavelength, power, polarisation, pulsation, and/or amplitude profile.

Machine M2 is not connected to the common raw material powder supply 17, but comprises an exchangeable raw material powder cartridge 67 from which the feeder 57 is filled for the layering process. Excess raw material powder may be sucked off (not shown) or captured in an exchangeable raw material powder bin (not shown). The raw material powder cartridge 67 and/or the raw material powder bin may use the same transport system 9 as the building chamber 11. Particularly, the raw material powder cartridge 67 and/or the raw material powder bin may be designed as building chambers.

Machines M3 and M4 are capable of processing two different kinds of raw material powder. Therefore, machines M3 and M4 each comprise two raw material powder buffers 55 to buffer the two different raw material powders separately. However, the excess raw material powder comprises a mixture of the two raw material powder types. Machine M3 comprises an internal recycling system 61 capable of at least partially separating the two components of the excess raw material powder for refilling the two raw material powder buffers 55. The internal recycling system 61 may be implemented to recycle all excess raw material powder. In an alternative embodiment, the internal recycling system 61 may be implemented to recycle a certain fraction of one component of the excess raw material powder whilst the rest of the excess material powder is separated in a common recycling unit 68. In a further alternative embodiment, the internal recycling system 61 may be implemented to recycle a certain fraction of each component of the excess raw material powder whilst the rest of the excess material powder is separated in a common recycling unit 68. The common recycling unit 68 is here provided for separating the two components of the excess raw material powder of the machines M3 and M4. The common recycling unit 68 feeds two separate raw material powder tanks 69 for storing the two different raw material powders separately. The raw material powder tanks 69 are used to refill the raw material powder buffers 55 of machines M1, M3 and M4 via a vacuum piping system 19 with new and/or recycled raw material powder of the appropriate type(s).

As explained previously in connection with the embodiment shown in FIGS. 1 to 4, the resource management system 39 with the control unit 41 is configured to receive signals indicative of a demand for resource material and/or resource items of any of the additive manufacturing machines from a manual operating staff input of the dashboard 27 and/or automatically triggered by a sensor detection or sensor measurement. For instance, the raw material powder buffers 55 may comprise a filling level detector to indicate a demand for refilling. The control unit 41 is further configured to schedule the supply of demanded resource material and/or resource items according to a pre-determined prioritization scheme for resolving demand conflicts as explained above.

While specific embodiments of the invention have been shown and described in detail to illustrate the application of the principles of the invention, it will be understood that the invention may be embodied otherwise without departing from such principles.

LIST OF REFERENCE NUMERALS

1 additive manufacturing facility
3 additive manufacturing machines
5 platform
7 supply system
9 transport system
11 building chamber
13 unpacking station
15 building chamber depot station
17 common raw material powder supply
19 vacuum piping system
21 window
23 control terminals
25 displays
27 request button
29 dashboard
31 parking lot
33 shielding gas supply
35 common shielding gas source
36 shielding gas supply
37 common filter unit
38 individual filter unit
39 resource management system
41 control unit
43 internal control modules
45 transportation hub
47 laser supply system
49 laser optics
51 process chambers
53 internal laser light sources
55 raw material powder buffer
57 feeder
59 catch basin
61 internal raw material powder recycling system
65 light guide system
67 raw material powder cartridge
68 common raw material powder recycling system
69 raw material powder tanks

The invention claimed is:

1. A resource management system for managing a supply of resource items to a plurality of additive manufacturing machines, comprising at least two additive manufacturing machines for additive manufacturing, wherein the resource items are building chambers with a circumferential side wall, a lid, and a carrier on which three-dimensional work pieces are producible by additive manufacturing at the additive manufacturing machines, wherein the carrier comprises heating elements and fixation points for temporary fixing the carrier from below, wherein the carrier is axially movable within the circumferential side wall and can be locked in a bottom position, whereby the carrier sealingly closes the building chamber from below, and wherein the lid is configured to sealingly close the building chamber at the top, wherein the resource management system comprises a control unit that is configured to receive a signal indicative of a demand for the resource items of any of the additive manufacturing machines, wherein the control unit is configured to schedule the supply of the demanded resource items according to a pre-determined prioritization scheme for resolving demand conflicts, wherein the resource management system further comprises a supply system for supplying at least one kind of the demanded resource items to the additive manufacturing machines in a manner scheduled by the control unit.

2. The resource management system according to claim 1, wherein a supply system is configured to supply the demanded resource items to a number of additive manufacturing machines smaller than a total number of additive manufacturing machines at a time.

3. The resource management system according to claim 1, wherein the prioritization scheme is based on a current severity ranking of consequences for undersupplying demanded resource items in a current operation state of the additive manufacturing machines.

4. The resource management system according to claim 3, wherein the control unit is configured to stop an ongoing supply to a first one of the additive manufacturing machines for starting a supply to a second one of the additive manufacturing machines under the cumulative conditions that:

undersupplying the second one of the additive manufacturing machines is inevitable without stopping the ongoing supply to the first additive manufacturing machine, and the current severity rank for undersupplying the second additive manufacturing machine is above a pre-determined first severity threshold, and the current severity rank for undersupplying the first additive manufacturing machine is below a pre-determined second severity threshold.

5. The resource management system according to claim 1, further comprising a laser supply system for supplying laser light generated by one or more laser light sources to the additive manufacturing machines in a manner scheduled by the control unit.

6. An additive manufacturing facility comprising:

a plurality of additive manufacturing machines, comprising at least two additive manufacturing machines for parallel additive manufacturing of three-dimensional work pieces, and a resource management system according to claim 1, for managing a supply of resource items to said plurality of at least two additive manufacturing machines.

7. The additive manufacturing facility according to claim 6, further comprising an unpacking station for unpacking a three-dimensional work piece from a building chamber and removing residual raw material powder from the three-dimensional work piece.

8. The additive manufacturing facility according to claim 6, further comprising a building chamber depot station for parallel pre-treatment and/or post-treatment of a plurality of building chambers.

9. The additive manufacturing facility according to claim 6, wherein at least one of the additive manufacturing machines comprises an internal raw material powder recycling system, wherein the internal raw material powder recycling system is configured to directly recycle residual raw material powder during an ongoing manufacturing process.

10. The additive manufacturing facility according to claim 6, wherein at least one of the addictive manufacturing machines comprises at least one raw material powder buffer for buffering raw material powder, wherein the at least one raw material powder buffer comprises a filling level detector configured to trigger a signal indicative of a demand for raw material powder as resource material.

11. The additive manufacturing facility according to claim 10, wherein the at least one raw material powder buffer is configured to receive directly recycled residual raw material powder during an ongoing manufacturing process.

12. A method for managing a supply of resource items to a plurality of additive manufacturing machines, comprising at least two additive manufacturing machines for additive manufacturing, wherein the resource items are building chambers with a lid, a circumferential side wall, and a carrier on which three-dimensional work pieces are producible from the resource items by additive manufacturing at the additive manufacturing machines, wherein the carrier comprises heating elements and fixation points for temporary fixing the carrier from below, wherein the carrier is axially movable within the circumferential side wall and can be locked in a bottom position, whereby the carrier sealingly closes the building chamber from below, and wherein the lid is configured to sealingly close the building chamber at the top, the method comprising:

receiving a signal indicative of a demand for the resource items of any of the additive manufacturing machines, and scheduling the supply of the demanded resource items according to a pre-determined prioritization scheme for resolving demand conflicts, wherein the prioritization scheme is based on a current severity ranking of the consequences for undersupplying the demanded resource items in a current operation state of the additive manufacturing machines.

13. The method according to claim 12, further comprising:

triggering the signal indicative of a demand for resource items manually by a request input of operating staff or automatically on the basis of a sensor detection or sensor measurement.

14. The method according to claim 12, wherein the prioritization scheme is based on a current severity ranking of the consequences for undersupplying demanded resource items in a current operation state of the additive manufacturing machines.

15. The method according to claim 14, wherein scheduling the supply comprises stopping an ongoing supply to a first one of the additive manufacturing machines for starting a supply to a second one of the additive manufacturing machines under the cumulative conditions that:

undersupplying the second additive manufacturing machine is inevitable without stopping the ongoing supply to the first additive manufacturing machine, and the current severity rank for undersupplying the second additive manufacturing machine is above a pre-determined first severity threshold, and the current severity rank for undersupplying the first additive manufacturing machine is below a pre-determined second severity threshold.

16. The method according to claim 12, further comprising directly recycling residual raw material powder during an ongoing manufacturing process.

17. The method according to claim 12, further comprising:

buffering raw material powder for at least one of the additive manufacturing machines in a raw material powder buffer of said at least one additive manufacturing machine, monitoring a filling level of the raw material powder buffer, and triggering a signal indicative of a demand of said at least one additive manufacturing machine for raw material powder as resource material.

18. The method according to claim 17, further comprising directly recycling residual raw material powder during an ongoing manufacturing process for said at least one additive manufacturing machine into the associated raw material powder buffer.

* * * * *